United States Patent [19]

Jensen

[11] 4,059,875

[45] Nov. 29, 1977

[54] TIRE RASP BLADES WITH RENEWABLE CUTTING AND BUFFING EDGES

[75] Inventor: Wayne E. Jensen, Homewood, Ill.

[73] Assignee: B & J Manufacturing Company, Glenwood, Ill.

[21] Appl. No.: 640,041

[22] Filed: Dec. 12, 1975

[51] Int. Cl.² .............................................. B23D 71/00
[52] U.S. Cl. ......................................................... 29/78
[58] Field of Search ...................................... 29/78, 79

[56] References Cited

U.S. PATENT DOCUMENTS

| | | | |
|---|---|---|---|
| 2,256,847 | 9/1941 | Osenberg | 29/78 X |
| 3,680,185 | 8/1972 | Wood | 29/79 |
| 3,879,825 | 4/1975 | Jensen et al. | 29/79 |

Primary Examiner—Harrison L. Hinson
Attorney, Agent, or Firm—Emrich, Root, O'Keeffe & Lee

[57] ABSTRACT

Blades for tire rasps are disclosed in which the outer edge of their teeth have cutting edges inclined at a positive rake angle and cooperating buffing edges inclined at a negative rake angle, the teeth having other similarly inclined cutting and buffing edges at levels inwardly of the original outer tooth edge to which the teeth may be sharpened as the original cutting and buffing edges become worn.

36 Claims, 22 Drawing Figures

TIRE RASP BLADES WITH RENEWABLE CUTTING AND BUFFING EDGES

This invention relates to expendable blades for tire rasps such as are used to remove worn tread or sidewalls and otherwise to condition areas of a tire surface as in its preparation for a recapping, retreading or other operation in which new rubber is applied to the worn tire surface.

As is well known, the damaged or worn surface of the tire is prepared for receiving new rubber by moving it relative to a more rapidly rotating rasp provided with rows of projecting teeth about its periphery which act on the contacted tire surface to loosen, tear, shear, grind off or otherwise remove the old rubber. Thereafter the remaining tire surface is reduced by buffing to a texture or a condition to which the new rubber applied in the vulcanizing or recapping operation will strongly bond.

In my assignee's Emil B. Jensen U.S. Pat. Nos. 2,896,309 and 3,082,506, blades for such rasps are disclosed in which the projecting teeth have leading edges inclined at a positive rake angle and form sharp prongs with the outer edge of the teeth. These dig into the rubber tire with rotation of the rasp to effectively shear large elongated slivers of rubber therefrom in a rapid manner and while developing a minimum amount of heat. Usually both side edges of the teeth are similarly inclined, but in diverging relation, so that either side edge may be utilized as the leading edge thereof dependent on the direction in which the blades are mounted or the rasp rotated. The outer edge of these teeth contain a notch which in U.S. Pat. No. 2,896,309 is disclosed as vee-shaped and in U.S. Pat. No. 3,082,506 as in the form of a radial slot, slit or one having a hemi-circular shape. Thus in either direction in which the rasp is rotated the trailing edge of the notch is inclined at a neutral or negative rake angle to the tire surface so that it effectively works on the tire surface cleared by the leading edge of the teeth to simultaneously buff or reduce the cleared surface to a condition or texture which markedly improves the bond of the newly applied rubber.

A principal object of this invention is to improve upon said patented tire rasp blades by so restructuring said teeth that, when their cutting and buffing edges become worn, the teeth may be sharpened to expose new cutting and buffing edges which then can be utilized so as to further extend the blade life but without loss of effectiveness.

In accordance with this invention, the teeth of tire rasp blades are also provided with outwardly diverging side edges which are sharply angled to the outer tooth edge to form hooks or prongs. The outer tooth edge also contains a notch such that the teeth effectively cut or shear the old rubber and then reduce the cleared surface of the tire to a fine buffing texture as described in the aforementioned patents. However, the leading and trailing edges of these teeth are reshaped to provide similarly inclined cutting edges which form sharp points or prongs at an inner level which become useful once the height of the teeth has been reduced to that level through wear or by sharpening. The notch in the outer edge of the teeth is either extended to below said level or an aperture is provided in the body of the teeth between said inner notches wherefore when the teeth are reduced to said level new cutting and buffing edges are created which continue the utility of the blade. At this new level, the now available cutting edges and buffing edges are inclined at the same rake inclinations and the cutting edges also form sharp prongs with the newly exposed outer tooth edge.

In the presently preferred forms of the invention the leading and trailing edges of the tire rasp blade teeth are separated by spaces comprising lapping polygonal and/or circular shaped cut-outs and define the shape of the leading and trailing edges of adjoining teeth. Thus at the intersection of said cut-outs they define laterally projecting prongs in said side edges which are spaced inwardly of the outer tooth edge and are in addition to the outer prongs formed by the intersection of said leading and trailing edges with the tooth outer edge.

In one of the disclosed forms of the invention, these inner prongs have both an upper side sloped or inclined at a negative rake angle and an underside sloped or inclined at a positive rake angle. In this form of the invention the teeth also contain an aperture centered with the inner prongs and which is so shaped that its trailing edge includes a portion inclined at a positive rake angle which is in line with the upper side of the inner prong of the tooth leading edge. Said trailing edge of the aperture also includes a further portion inclined at a negative rake angle and which is in line with the under side of the same inner prong in the leading edge of the tooth. Thus, as the outer edge of the teeth becomes worn and the cutting ability of the outer prong diminished, the teeth may be sharpened to a first level at which the trailing edge portion of the aperture which is inclined at a positive rake angle forms a sharp prong with the new outer edge of the tooth and by reason of its positive rake angle is effective as a cutting edge. At this level the upper edge of the inner prong and the leading side edge of the tooth is inclined at a negative rake angle such that it is effective to buff the tire surface cleared by said inclined portion of the aperture trailing edge. With further wear and/or sharpening, the height of the tooth is further reduced to a still lower level where the under side of the inner prong in the leading edge becomes effective as the cutting edge and the portion of the trailing edge of the aperture now exposed becomes effective as the buffing edge. Thus, in this form of the invention, the blade teeth have three different levels of cutting and buffing edges and thereby an effective useful life of threefold that of conventional blades.

Thus a feature of this invention is that as the outer edge of the rasp blade teeth become worn, new cutting edges and buffing edges become available to extend the useful life of the blade beyond that of conventional blades.

Another feature of the invention is that the portions of the notches or apertures which align between the inner prongs in the leading and trailing edges of the teeth provide a ventilating or cooling effect both on the edges attacking the tire surface and also on the inner prongs.

Thus a further feature of the invention is that the novel tooth structure constitutes a heat sink which dissipates transfer of heat to the inner prongs as it is generated in the attacking outer edge of the teeth and so protects said inner prongs from possible heat damage.

Thus a particularly important feature of the invention includes the resultant longer useful life which is afforded the tire rasp blades consequent to the renewed buffing and cutting edges which the tooth shape provides and the heat dissipation which is also afforded thereby.

Another feature and/or object of the invention is the provision of rasp blades with a working edge that is effective both to rapidly reduce the tire surface to a suitable buffed texture and which as it becomes worn may be renewed as by sharpening.

Still other features of the invention include the provision of tire rasp blades with cutting and buffing edges both at their outer edge and inwardly of said outer edge, the latter becoming available as the outer tooth edge wears. In some forms of the invention this results automatically with wear and in other forms it is necessary to sharpen the outer edge to the new level.

A still further feature is the increased effectiveness of the cutting and buffing edges of the teeth at the different levels which result both from the angle at which said edges attack the tire surface and also by reason of the rapid dissipation of heat generated by said attack.

A further feature of the invention is that the aforesaid features and advantages may be obtained in a blade construction which lends itself to conventional manufacturing techniques and is a wholly practical and economical structure to produce as well as one being highly efficient and effective in its use.

Many other objects, advantages and features of the invention will be at once apparent or will become so from the description of preferred forms of the invention which now will be described.

Referring first to the drawings.

Figure 1:
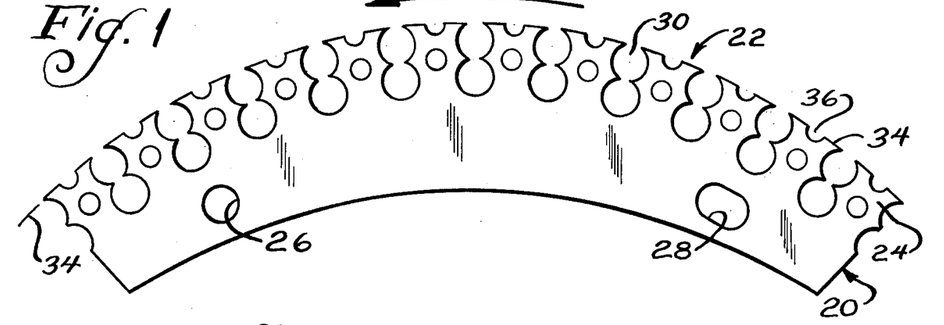
FIG. 1 ilustrates in plan view a first embodiment of the invention in expendable tire rasp blades.
Figures 3, 4, 4A, 5, 6:
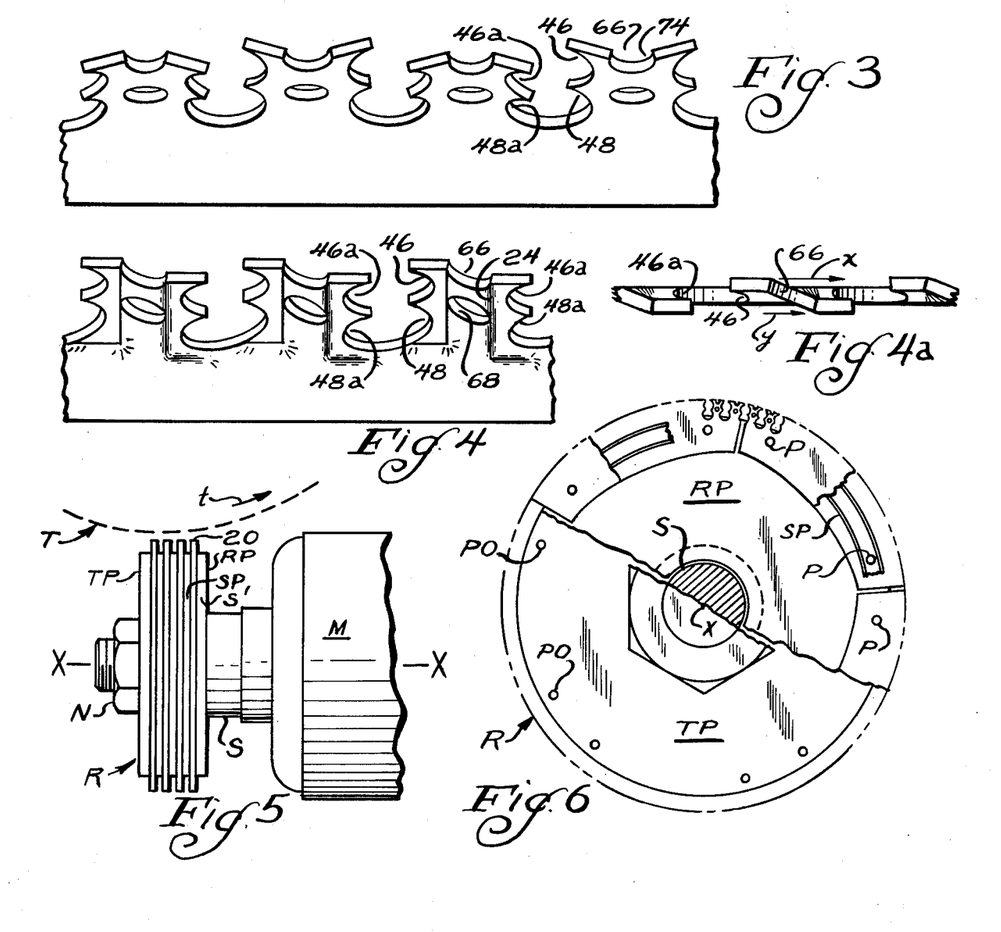
FIG. 3 is a view generally similar to FIG. 2 and shows a second set which may be applied to the teeth.
FIG. 4 is another view generally similar to FIG. 2 and illustrates still another set which may be applied to the teeth.
FIG. 4a is a fragmented top view of the blade illustrated by FIG. 4.
FIG. 5 is a side elevational view of a conventional tire rasp in which the blades of the present invention have utility.
FIG. 6 is an end view of the rasp of FIG. 5, the same being partially fragmented and sectioned and illustrates one arrangement of the blades therein and details of the rasp mounting.

Referring now more particularly to the several views wherein like parts are identified by like reference numerals, FIG. 1 illustrates at 20 a first embodiment of the invention in expendable tire rasp blades which may be stamped or otherwise formed from sheet metal according to conventional methods. As illustrated, such blades have a generally concavo-convex shape and in their preferable form comprise an annular segment of a predetermined angular extent, although they also may comprise a full annulus of 360°. In the illustrated example, blades 20 each have an angular extend of nearly 72° wherefore five blades when arranged end-to-end complete a full annular row or circle thereof as depicted in FIG. 6. Such blades are illustrated as having an outer convex-shaped working edge indicated generally at 22 comprising spaced teeth 24. Such blades also have means in the form of openings 26,28 in the body thereof and spaced from said working edge 22 by which the blades are adapted to be mounted within a rasp indicated generally in FIG. 5 at R.

As is conventional, tire rasp R embodies an outer or top plate TP and a rear or pin plate RP which are centrally apertured to receive the reduced end of shaft S of a motor M. Rear plate RP has pairs of axially directed pins P (FIG. 6) over which blades 20 are assembled by means of apertures 26,28. As is conventional, blades 20 are thereby arranged in spaced concentric relation about axis x—x of the rasp of R such that their teeth 24 project outwardly beyond the periphery of the rasp for attack on the tire surface to be prepared for application of new rubber. As illustrated in FIG. 6, top plate TP also has correspondingly spaced openings PO to receive pins P. As illustrated in FIG. 1, openings 26 in the blades are circular whereas their openings 28 are somewhat elongated in the direction of the arcuate extent of the blades in order to facilitate assembly of the blades 20 over the pins P. Conventionally the blades are arranged in rows which are separated by spacers SP. Spacers SP may comprise centrally apertured discs of appropriate thickness but preferably comprise segments of an annulus as illustrated in FIG. 6. As illustrated, they have a generally convexo-concave shape and an angular extent corresponding to that of the blades with which they are assembled. To satisfy particular requirements the blades and spacers may be arranged to define parallel rows of blades or they may be arranged in discontinuous rows or in the form of a helix which spirals about axis x—x. Some users prefer that every other blade in a row be oppositely set an an angle to axis x—x to provide an oscillating effect when the hub is rotated. Where the blades are to be arranged in other than circular rows, it is common to provide the facing surfaces of the plates RP and RT with appropriately shaped surface sections and shoulders to achieve a desired relationship. Such is well known in the art and one such arrangement is illustrated and discussed in the aforementioned U.S. Pat. No. 3,082,506. The rasp hub R when assembled with the blades and spacers between its plates RP and RT is mounted over the end of shaft S and held tightly against shoulder S' as by tightening nut N on the threaded end of said shaft S so that the hub and its blades rotate with motor M about axis x—x thereof. In use of the rasp, tire T is mounted on conventional means (not shown) for rotation about its axis, for example, in the direction indicated by the arrow t, suitable means being employed to move either of the mounts for the tire or the hub toward and away from the other in order to control the depth of cut or thickness of material removed from the tire surface. Conventionally, the tire T is continuously rotated but more slowly than is the rasp R. Means are also provided for moving one of the mounts relative to the other such that the action of the blade teeth on the tire periphery will trace a required pattern across the width of the tire tread and/or into the shoulder in reducing the same to a desired contoured shape. As thus described, the construction and operation of a buffing or tread removing machine employing rasps R is conventional and well known to the art in which this invention in blades has utility.

Figure 7:
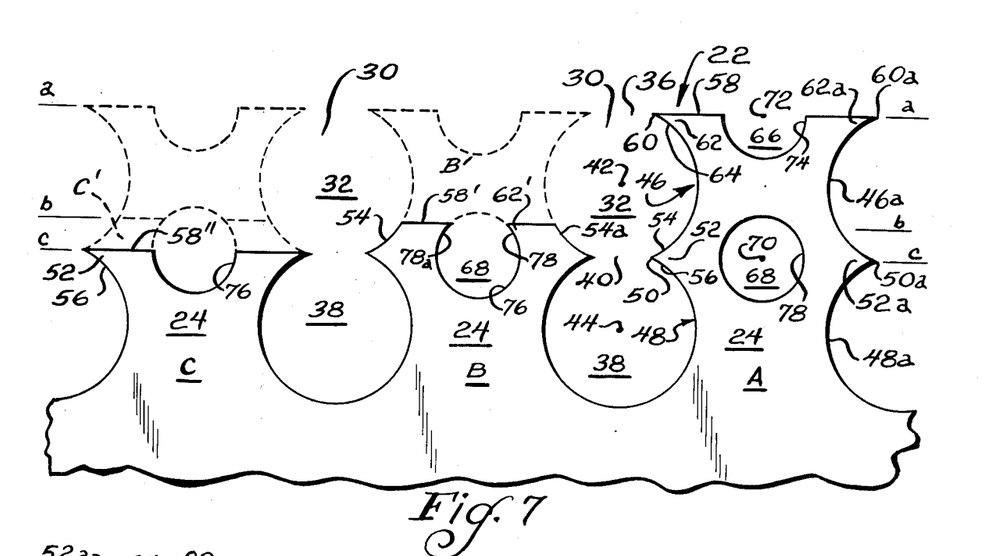
FIG. 7 illustrates the levels of cutting and buffing edges to which the outer edge of the teeth of the FIG. 1 blade may be sharpened and/or will wear.

Considering now FIG. 7 with FIG. 1, the working edge 22 of the blades comprising this first embodiment of the invention embody teeth 24 separated by spaces 30 which define the shape of the leading and trailing side edges of said teeth. Each said spaces 30 embodies an outer circular cut-out 32 which interrupts the outer edge 34 of the blade to provide a mouth 36 of a limited angular extent which is less than the diameter of the cut-out 32. Said spaces further include a similarly sized inner circular shaped cut-out 38 which laps the outer circular cut-out 32 as at 40. Outer circular cut-out 32 is defined by a radius turned on center 42 and inner circular cut-out 38 by a radius of the same length which is turned on center 44. Centers 42 and 44 are radially spaced from each other and from the outer edge of the blade such that mouth 40 subtends an arc corresponding to the arc subtended by mouth 36.

As previously stated, in the illustrated embodiment, said lapping circular cut-outs 32,38 define the shape of the leading and trailing edges of the adjacent teeth 24 which they space. This arrangement is to be preferred. However, in modifications thereof, other shaped teeth may be interspersed between teeth 24 in which event spaces 30 will comprise only that fraction of cut-outs 32,38 required to form the characteristic shape of the teeth 24 as illustrated by FIG. 7. As illustrated in said FIG. 7, the leading edge of each of said teeth 24 comprises a first arcuate segment 46 of the first circular cut-out 32 and a second arcuate segment 48 of the second circular cut-out 38. These segments intersect or meet at 50 to form an inner prong 52 in the leading edge of the tooth having an upper edge 54 sloped or inclined at a negative rake angle and an under edge 56 sloped or inclined at a positive rake angle of similar inclination. As illustrated, arcuate segment 46 also intersects the outer edge 58 of the blade teeth as at 60 to form a sharply pointed outer prong 62. The underside 64 thereof is sloped or inclined at a positive rake angle as is the underside 56 of the inner prong 52.

It will be understood further that the trailing side edges of the teeth 24 correspond in shape and dimensions to their leading edge. Thus, the trailing edge of said teeth also comprise arcuate segments 46a, 48a which intersect or meet at 50a to form an inner prong or point 52a which extends laterally in a direction opposite to inner prong 52 on the leading edge of the tooth. The outer segment 46a similarly intersects the outer tooth edge at 60a to form an outer prong or point 62a. As illustrated in FIG. 7, both the inner prong 52a and outer prong 62a of the trailing side edge of said teeth, including their under and upper sides, essentially duplicate in location, size, shape and disposition the corresponding inner prong 52 and outer prong 62 of the leading edge of that tooth, but in reverse relationship. Therefore in accordance with the direction in which the blades are assembled in rasp R or rasp R is rotated, either side edge of the teeth can constitute the leading edge of the tooth and in which event the other side edge constitutes the trailing edge.

In accordance with the invention, each of said teeth 24 further contains a notch 66 which interrupts the outer edge 58 of the teeth midway between the outer prongs 62,62a. Said teeth 24 further contain a circular-shaped aperture or opening 68 spaced below notch 66, the center 70 of said aperture or opening 68 being spaced midway between and at the level of the inner prongs 52,52a. Notch 66 is illustrated as having a hemicircular shape and its center 72 on or slightly above the outer edge 34 of the blade and/or outer edge of the teeth. Notch 66 also has a depth equal to or only slightly less than the level defined by centers 42 of the first circular cut-outs 32. Notch 66 may also comprise a radially disposed slit or narrow slot and it may also be essentially of vee-shape. As afterwards made clear, notch 66 may be given any shape in which its trailing edge 74 will have an inclination other than at a positive rake angle as characterizes the underside 64 of the outer prong 62.

By reason of its positive rake angle, underside 64 effectively cuts the old rubber tread in large elongated slivers from the contacted tire surface as said outer prong digs into the tire surface in a manner as described for the leading edge of the teeth of the blade in the aforementioned U.S. Pat. No. 3,082,506. On the other hand, the trailing edge 74 of notch 66 is inclined either radially, as in the case of a slit or slot and therefore of zero or neutral rake, or at a negative rake angle as in the case of a vee-shaped or half-circular shaped notch. These inclinations have been found particularly effective in working on the tire surface as it is cleared by the leading prong 62 to simultaneously reduce said cleared surface to a fine texture and one to which the new rubber strongly bonds.

Although for reasons hereinafter made clear, notch 66 preferably terminates short of aperture 68, it may also lap aperture 68 to establish communication therewith or said notch 66 may be extended to a depth such as to effectively eliminate aperture 68.

Figure 2:
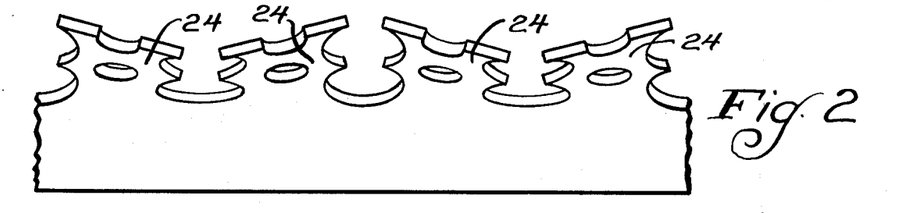
FIG. 2 is a fragmented perspective view of a portion of the blade of FIG. 1 and illustrates one setting which the teeth may be provided in order to expose both the cutting and buffing edges thereof.

Teeth 24 have also been found more effective in their cutting and buffing action on the tire surface when the respective cutting and buffing edges thereof are opened up as by setting the teeth and/or said edges at some inclination or offset relation to the blade body. FIG. 2 illustrates one suitable setting in which the body of the teeth 24 have been given a twist such that the teeth extend transversely of the blade body at some appropriately small angle thereto in the order of 10° to 35°. The teeth may be given the same angular setting or some of the teeth may be given a different angular setting. Every other tooth also may be oppositely set. FIG. 3 illustrates a second setting in which the teeth are radially struck such that their side edges 46,48 and 46a, 48a are disposed at one side of the blade, the trailing edge 74 of the notch 66 and 78 of aperture 68 remaining essentially in the plane of the blade body. FIG. 3 shows every other tooth as oppositely struck. It will be understood, however, that all of the teeth may be struck to the same side of the blade. As afterwards explained it is also preferable that the setting or twist imparted to the teeth extend to a depth below the level of center 70 of aperture 68 or the sharpest portion of the inclined underside of the inner prongs 52,52a.

FIGS. 4 and 4a illustrates a particularly useful setting of the teeth wherein the effectiveness of the notch 66 and aperture 68 as a heat sink is increased by laterally crimping the teeth 24 such that the leading edge 46,48 of the teeth 24 are disposed in a first plane offset to one side of the blade body whereas their trailing edge 46a, 48a are in a second but near parallel plane offset to the opposite side and the intermediate portion of the teeth containing the notch 66 and aperture 68 are acutely angled between said offset planes. Such crimping thus provides space immediately adjacent the surfaces of the teeth for passage of cooling air (arrows y, FIG. 4a) on both sides of the cutting edge in rotation of the rasp for dissipation of heat. It also opens up the trailing edges of the notched teeth for their cutting and/or buffing functions at each of their several levels as afterwards described.

The trailing edges of the teeth and the leading edges of the notches 66 of said teeth are respectively mirror images of the leading edges of said teeth and the trailing edges of their notches. Thus, in time the outer prongs 62 on one side wear to an extent that they are no longer effective. The life of the blades, however, may be increased by reverse mounting the blades in the rasp R or oppositely rotating the rasp so that outer prongs 62a now lead the teeth and edges 74a of their notch 66 trail. In this reverse position or operation of the blades, the teeth are again effective to clear the surface of tires of old rubber and buff the cleared tire surface to the required fine texture. It will be recognized, however, that with continued use of the blade, nevertheless, both outer prongs 62 and 62a, as well as both edges of notch 66 eventually will become sufficiently worn as to be no longer effective as cutting or buffing edges. In the past when this occurred, the blades were discarded and the rasp R remounted with fresh new blades.

However, it is a feature of this invention that, when this occurs, the operator needs only to sharpen the outer edge of the teeth, reducing the height of the teeth to a new lower level at which new level the teeth present new cutting and new buffing edges, therefore the blades continue to be useful in removing the old tread from tire surfaces and buffing them to the required texture.

FIG. 7 illustrates the original shape and form of the teeth at A and their operating level at a—a when the outer edges of the teeth become worn, they are sharpened to level b, at which level the portion illustrated by phantom lines at B' has been removed and the teeth assume the shape illustrated at B. At level b the leading edge of the teeth 24 now comprises an edge 54 which is inclined at a negative rake angle so that it is not effective as a cutting edge as was edge 64 at the original level a of the teeth 24, but it is a useful buffing edge. At level b, aperture 68 has been interrupted by newly formed tooth outer edge 58' such that the upper trailing edge portion 78 of aperture 68 creates a sharp prong 62' generally similar to outer prong 62. Also, at this second level b the underside of said newly created prong 62' represented by the trailing edge 78 of aperture 68 is inclined at a positive rake angle such that it is effective to shear the old rubber from the tire surface against which the rasp is operated. Thus by sharpening the teeth 24 to level b the utility of the blade has been restored.

As prong 62' wears with further use of the rasp, and elimination of edge 54, the blades may be again reversely mounted in the rasp, or the rasp oppositely rotated, so that edge 78a of aperture 68 now becomes the cutting edge and 54a of the tooth leading edge becomes the buffing edge. When cutting edge 78a and buffing edge 54a become worn and ineffective for their intended function, the working edge of the blade may be further sharpened to level c, at which level the teeth 24 are reduced to the height and to the shape illustrated at C. At level c (portion C' now removed) the leading edge of the teeth 24 comprises the inner prong 52 which by reason of the positive rake angle inclination of its underside 56 is acutely angled to the newly created outer tooth edge 58" and is effective to continue the blade action of shearing old rubber from the tires against which the rasp R is operated. At level c trailing edge 76 of aperture 68 is now available and by reason of its inclination at a negative rake angle, it is effective to buff the tire surface as it is cleared by the leading edge 56 of the teeth. Thus the utility of the blade has been revived once again, and the blade has a life three-fold that of conventional blades.

It will be appreciated that the life of the blade can be further extended by adding a third circular cut-out beneath the inner circular cut-out 38 and providing a second aperture centered between the second set of inner prongs thus created. It should also be understood, however, that in this further modification it may be necessary to also increase the blade thickness in order to provide necessary tooth strength. At present it has been found most satisfactory to limit spaces 30 to two circular cut-outs 32, 38 each having a maximum diameter of about 0.5 inches where the sheet metal out of which the blades are stamped have a thickness in the order of 0.042 inches.

In tests conducted to date it has been found that notches 66 and apertures 68 not only cooperate with the inner prongs of the outer side edges of the teeth at the aforesaid three described levels to provide the requisite initial cutting and subsequent buffing edges as above described; but by reason of their disposition and size they also act as a heat sink which dissipates the heat which would otherwise be generated within the teeth and with possible detrimental effect on the inner prongs 52, 52a. It has been further found that in the described location of notch 66 and aperture 68 the above described utility can be obtained without detrimentally effecting the tooth strength.

Figures 8, 9, 10, 13:
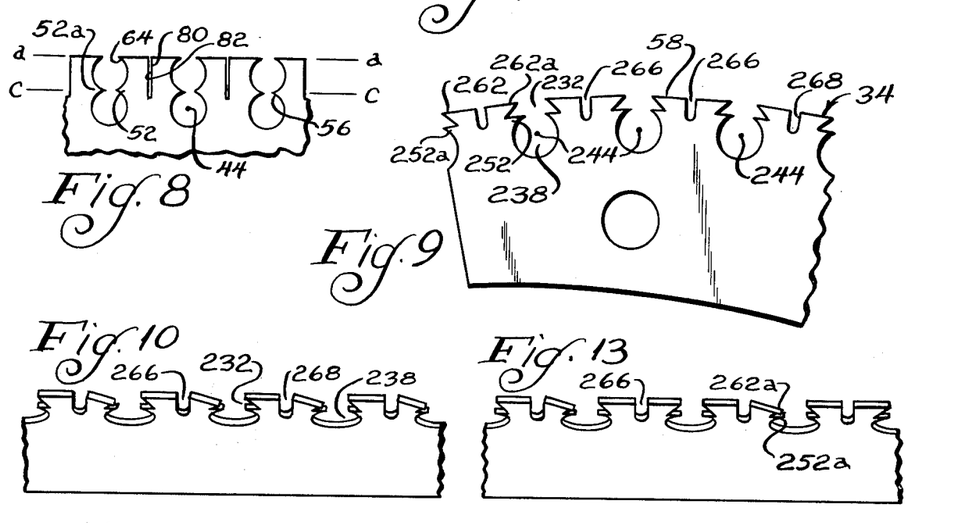
FIG. 8 is a fragmented view of the blade illustrated in FIG. 1 and illustrates a modification thereof.
FIG. 9 is a plan view generally similar to FIG. 1 and illustrates a third embodiment of the invention.
FIGS. 10, 11, 12, 13, 14, 15 and 16 are fragmented perspective views illustrating various settings which may be applied to the teeth of the FIG. 9 embodiment.

The employment of a semi-circular shape or notches 66 and a circular shape for apertures 68 has been found particularly advantageous. However, useful life of the blades can also be increased utilizing other notch and aperture shapes. Thus FIG. 8 illustrates a modification of the first described embodiment of FIG. 1 wherein notch 66 and aperture 68 are replaced by a slit 80 which extends to a depth below inner prongs 52, 52a and preferably to the level of centers 44 on which the inner circular cut-outs 34 are defined. In this modification the leading and trailing side edges of the teeth are as described above in connection with FIGS. 1 and 7. Their buffing edges which cooperate with the leading edge of the teeth is the radially disposed trailing edge 82 of slit 80 which is effectively inclined at a zero or neutral rake angle through its full length. Thus in the FIG. 8 embodiment at level a the teeth have a first cutting edge 64 which is effective to shear the old rubber from the tire surface and a buffing edge represented by the trailing edge 82 which is simultaneously effective to reduce the texture of the cleared surface. As the outer prongs become worn the teeth may be sharpened to level c where the inner prongs 52 and their under sides 56 become effective cutting edges. Because the trailing edge 82 of slit 80 extends below level c, its trailing edge remains effective to buff the cleared surface in the use of the blade at this new level of their teeth.

Figure 20:
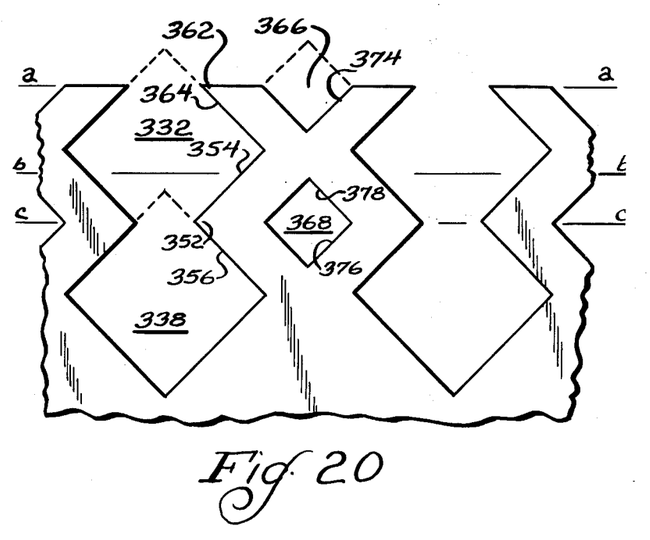
FIG. 20 is a fragmented view showing still another embodiment of the invention and its three levels of cutting and buffing edges.
Figure 21:
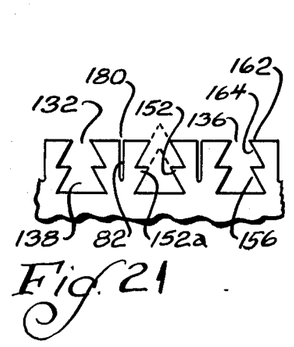
FIG. 21 is a fragmented view of a still further embodiment of the invention.

FIG. 21 illustrates a further embodiment of the invention wherein slit 80 and its trailing edge 82 are retained but the leading and trailing edges of the teeth now are defined by polygonal shaped inner and outer cut-outs 132 and 138. In FIG. 21 these lapping polygons are essentially triangular in shape. In FIG. 20 they are essentialy rectangular or square in shape. In the embodiment of FIG. 20, unlike the embodiment of FIG. 21, the notch interrupting the outer edge of the teeth comprises two sides of a rectangular or square and the inner aperture spaced therebelow comprises a square or other rectangle but of a smaller dimension than the rectangular cut-outs 332, 338. In the case of the FIG. 20 embodiment, the outer rectangular shaped cut-out 332 which interrupts the outer edge of the teeth to form sharp outer prongs at 362 also has an inclined leading edge 364 and a negative inclined edge 354 which functions generally as the corresponding edges 64 and 54 of the outer circular cut-out 32 of the FIG. 1 embodiment. The inner rectangular cut-out 338 also has a leading edge 356 inclined at a positive rake angle and located below inner prong 352. The trailing edge 374 of the outer notch 366 is set at a negative rake angle and the rectangular shaped inner aperture 368 has its trailing side edge comprising an upper portion 378 set at a positive rake angle and a lower portion 376 set at a negative rake angle. The embodiment of FIG. 20 may be succesively sharpened to levels b and c as described above in connection with the FIG. 1 embodiment such that it is effective at three levels to cut and simultaneously buff.

Referring, however, to the FIG. 21 embodiment, the upper triangular cut-out 132 interrupts the outer blade edge at 136 forming sharply pointed outer prongs 162 in the leading edge of the tooth. Outer prongs 162 have an inclined underside 1640 which (in the direction of rotation of the rasp in which they are mounted) leads the teeth and is inclined at a sharp positive angle and function as cutting edges 62 in the first described embodiment of FIG. 1. The lapping of the triangular cut-outs also creates inner prongs 152 and 152a which have inclined under sides 156 and therefore function as do inner prongs 52 and 52a of the FIG. 1 embodiment when the teeth are sharpened to level c. At both levels, the trailing edge 82 of slit 80 (by reason of its zero rake angle) is also effective to buff the surface cleared by the leading prongs at the respective levels. In the FIG. 21 embodiment, however, unlike the first described embodiment of FIG. 1, and the embodiment of FIG. 20, there is no intermediate level b to which the teeth may be sharpened.

Figure 17:
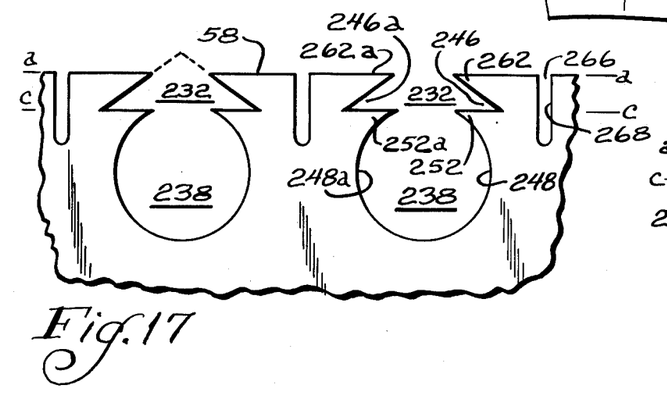
FIG. 17 illustrates the levels of cutting and buffing edges embodied in the blades of FIG. 9.
Figure 18:
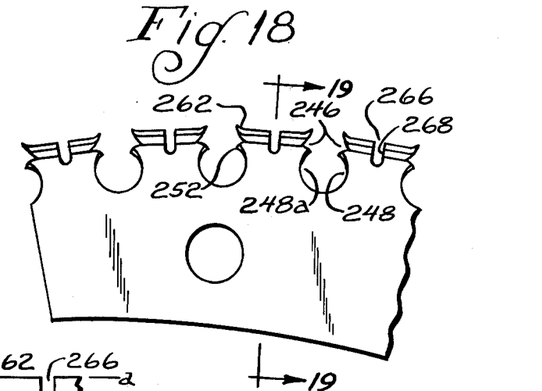
FIG. 18 illustrates still another embodiment of the invention.
Figure 19:
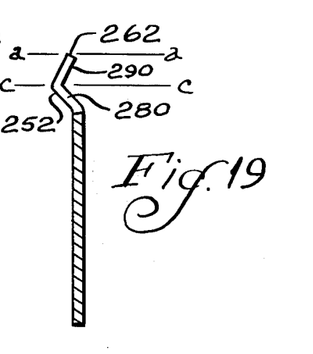
FIG. 19 is a sectional view taken through FIG. 18 along lines 19—19.

Referring now to FIGS. 9 through 19, and particularly FIG. 17, still further embodiments of the invention are illustrated wherein the teeth are separated by spaces comprising lapping inner circular cut-outs 238 and outer triangular-shaped cut-outs 232. The triangular outer cut-outs 232 are illustrated as interrupting the outer edge 58 of the teeth (or 34 of the blade) to provide outer leading and trailing prongs at 262 and 262a respectively. The outer triangular shaped cut-out 232 also interrupts the inner circular shape cut-out 238 to provide laterally extending inner prongs 252, 252a which correspond to the inner prongs of the other described embodiments. In these embodiments, however, the vee-shaped indentation 246 which appears in the leading and trailing edges of the teeth between their inner and outer prongs is substantially smaller in radial depth than is the arcuate segments 248 comprising the portion of the leading and trailing sides of said teeth below the inner prongs. Where the teeth are crimped longitudinally of the blade, and intermediate said inner prongs 252 and outer prongs 262, as for example illustrated by FIGS. 18 and 19, the two levels a and c which the cutting and buffing teeth edges are found can be located at nearly the same radial distance from axis x—x on which the rasp rotates. Thus, as illustrated in FIG. 19, the inner tooth portion 280 containing inner prongs 252 may be inclined at approximately 45° to the blade body and located to one side of the blade. The outer portion 290 of the teeth which contains the outer prongs 262 is inclined in the opposite direction at near 90° to the inclination of portions 280 such that the outer prongs lie approximately in the plane of the teeth body, but at a distance substantially less than the separation of the inner and outer prongs without such crimping. By changing the angles of said inclination of said outer and inner tooth portions 280 and 290, the inner prongs 252 can be located close to the tooth body and the outer prongs 262 to the opposite side of the tooth body, but at more nearly the same radial distance from the mentioned axis x—x of the rasp in which the blades are mounted. Thus, shifting to the cutting and buffing action of the teeth from the outer level a to the inner level represented at c can be obtained without substantially changing the diameter of the rasp.

One further advantage of utilizing a triangular-shaped outer cut-out 232 as in the embodiments of FIGS. 9 and 18, and also FIG. 21, is that the leading edges 264 (or 164 in FIG. 21) of the teeth at the outer tooth edge remain effective cutting edges until said outer portion of the tooth has been substantially reduced to level c. The requisite sharpening is minimal and in some instances can be eliminated altogether. In the embodiments illustrated by FIGS. 9 and 18, the notch 266 between the leading and trailing edges thereof has been illustrated as a slot or slit with radially disposed leading and trailing edges. Notch 266, however, also may be vee-shaped so that in the direction of rotation of the blade its trailing edge 268 is effectively inclined at a negative rake angle and is the preferred inclination for buffing purposes. Also, as illustrated, notch 266 is extended to approximately the level represented by centers 244 of the circular shaped cut-outs 238.

FIGS. 10 through 16 illustrate different settings for the teeth of the FIG. 9 embodiment which may be employed to increase the effectiveness of their cutting and buffing edges. Such settings also promote circulation of air about and/or across said buffing and cutting edges to dissipate heat build up. Although the teeth settings in said figures are illustrated in connection with the FIG. 9 embodiment, it will be understood that the illustrated settings are also similarly useful for the earlier described embodiments, including FIGS. 1, 8, 18, 20 and 21.

Thus FIG. 10 illustrates a tooth setting wherein the leading edge of each tooth is left in the plane of the tooth body and its trailing edge twisted out of said plane and set at a small angle to one side thereof so as to open up the trailing buffing edge 268. Although this set is illustrated as applied to each tooth of the blade, it will be understood that in some instances it may be desired that this set or twist be provided in some of the teeth but not in others, for example in every other tooth.

Figure 11:
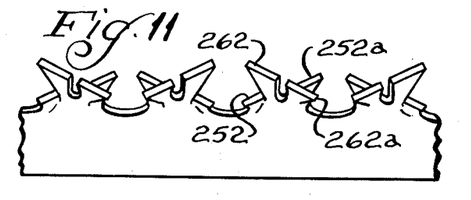

FIG. 11 illustrates a setting wherein the upper portion of each tooth containing prongs 262 and 262a is twisted such that the prongs are transversely set in a line disposed at an acute angle to the tooth body whereas the lower portions of the teeth containing inner prongs 252, 252a is twisted in the opposite direction such that the inner prongs also extend transversely across the blade but at right angles to the setting of the outer prongs. As illustrated in FIG. 11, the outer prongs of one tooth are in parallel relation to the outer prongs of the other teeth as are the inner prongs of each tooth with respect to the inner prongs of the outer teeth. However, other possible arrangements may be utilized.

Figure 12:
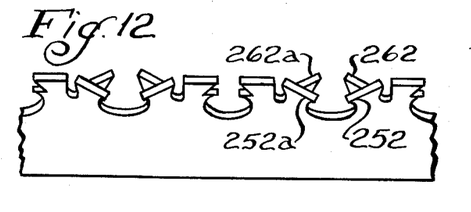

FIG. 12 illustrates a setting wherein the trailing prongs 252a and 262a only of every other tooth are set to opposite sides of the blade body and facing the leading prongs 262, 252 of the intervening teeth which are similarly set to opposite sides of the blade body.

FIG. 13 illustrates a tooth setting wherein the outer prong 262a but not the inner prong 252' of one edge of every othertooth is offset to one side of the blade body, the remainder of the tooth being left in the original plane of the tooth body. In FIG. 13 said setting is illustrated as applied to every other tooth. However, it could be applied to every tooth. Also, in some of the teeth, the set could be applied to the outer prong of the other tooth edge.

Figure 14:
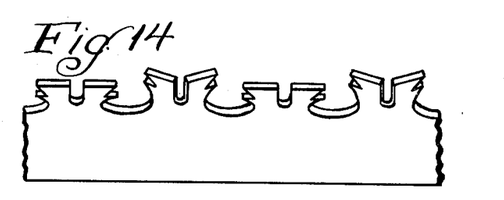

FIG. 14 illustrates a tooth setting wherein both the inner and outer prongs of the leading and trailing portions of every other tooth are offset to the same side of the blade body to impart a substantial vee-shape in top plan view. In this setting the prongs at each level are at acute angles with respect to each other. In this setting the intervening teeth are illustrated as retained in the plane of the blade body. However, all of the teeth can be given said vee-shape setting; also every other tooth could be oppositely set.

Figure 15:
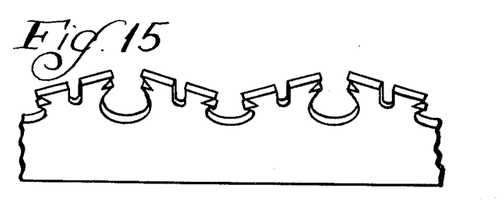

FIG. 15 illustrates a further setting in which every other tooth is given a twist at a small angle to the blade body and the intervening teeth are given a similar twist but in the opposite direction.

Figure 16:
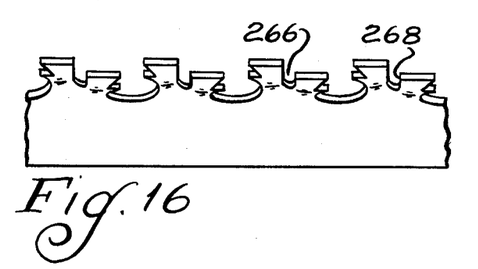

FIG. 16 illustrates a setting wherein the trailing half of every other tooth is inclined at a small angle to one side of the blade body so as to open up the trailing edge 268 of slot 266, the intervening teeth being retained in the plane body or alternatively inclined to the opposite side thereof. Other tooth settings consistent with the need to expose both the leading edge of each tooth and the trailing edge of the notches to maximize the effectiveness of the blades in their attack on the tire surface may also be utilized.

It will be appreciated and should be understood that the invention as thus far described is not to be considered as restricted to blades that are adapted for mounting in the tire rasp hub of FIGS. 5 and 6. It is particularly concerned with the working edge of such blades irrespective of the design afforded the body of said blades which adapt them for mounting in a specific tire rasp or buffing hub. Thus the invention has utility where the working edge of such blades is non-arcuate or straight, as well as convex. The invention is applicable to the working edge of blades of both the disk and annular types wherein the working edge has an annular extent of 360°, as well as some fraction thereof. It is also applicable to blades of so-called reversible type wherein the blade has both inner and outer convex shaped working edges, either of which may be optionally disposed at the outer periphery of the rasp in use. The invention is also applicable to blades of the type such as are mounted in so-called disc hubs wherein the blades have straight working edges and are mounted on one side of a disc and/or so that their working edge is disposed generally parallel to the rotational axis of the hub rather than radial or at some angle thereto as in the hub illustrated by FIGS. 5 and 6. The described teeth and their setting may comprise all or only some of the teeth of the working edge of the rasp blade. The invention may also be applied to blades in which the working edge comprises a single tooth. Exemplary of such blades, and the hubs in which the blades are mounted, are illustrated in U.S. Pat. No. 3,879,825 to which reference may be had and the subject matter of which is incorporated by this reference thereto.

Thus in the aforesaid description it will be apparent that all of the recited objects, advantages and features of the invention have been demonstrated as obtainable in a blade by means of a tooth construction which is both convenient and economical to manufacture and at the same time is one extremely effective in its performance.

Having described my invention, I claim:

1. Blade for a rotatable tire rasp comprising a sheet metal member having an outer working edge and means spaced from said edge adapted for mounting the blade in said rasp, wherein the working edge thereof includes a tooth having multi-pointed leading and trailing side edges, an outer edge, and an intermediately notched area interrupting the outer edge of said tooth, said leading and trailing side edges of the tooth each having a first laterally projecting prong at the outer edge of the tooth and at least a second laterally projecting prong at a level spaced inwardly of the first prongs.

2. Blade as claimed in claim 1 wherein said tooth having multi-pointed leading and trailing side edges also has an opening spaced between its leading and trailing edges and below the notched area which interrupts the outer edge of the tooth.

3. Blade as claimed in claim 1 wherein said notched area extends to a depth below the level of the second laterally projecting prongs of the leading and trailing side edges.

4. Blade for a rotatable tire rasp comprising a sheet metal member having an outer working edge and means spaced from said edge adapted for mounting the blade in said rasp, wherein the working edge thereof includes a plurality of teeth at least some of which have multi-pointed leading and trailing side edges, an outer edge, and an intermediately notched area interrupting the outer edge of said teeth, said multi-pointed side edges having first laterally projecting prong at the outer edge of the teeth and second laterally projecting prongs at a common level spaced inwardly of the first prongs.

5. Blade as claimed in claim 4 wherein said teeth having multi-spaced leading and trailing side edges have an opening spaced between their leading and trailing side edges and below the notched area which interrupts the outer edge of the teeth.

6. Blade as claimed in claim 5 wherein said teeth having multi-pointed leading and trailing side edges are so crimped that their leading and trailing side edges lie in planes to opposite sides of the tooth body, the intermediate portion of said teeth containing the notched area and opening being angled to said planes.

7. Blade as claimed in claim 4 wherein said notched area extends to a depth below the level of the second laterally projecting prongs of the leading and trailing side edges.

8. Blade as claimed in claim 4 wherein the second prongs are laterally bent to one side of the tooth body and the first prongs are laterally bent in the opposite direction.

9. Blade as claimed in claim 4 wherein the first prongs lie generally in the plane of the tooth body.

10. Blade as claimed in claim 8 wherein the notched area extends to at least the bend of the second prongs.

11. Blade as claimed in claim 4 wherein said teeth having multi-pointed leading and trailing side edges are so crimped that their leading and trailing side edges lie in planes to opposite sides of the tooth body, the intermediate portion of said teeth containing the notched area of the outer edge of the teeth being angled to said planes.

12. Blade as claimed in claim 4 wherein the first prongs are separated from the second prongs by generally vee-shaped notches in the leading and trailing side edges of the teeth.

13. Blade as claimed in claim 12 wherein the vee-shaped notches have convergingly related inclined slopes which intersects the outer edge of the tooth to form the first prongs.

14. Blade as claimed in claim 13 wherein the vee-shaped notches have second edges which lie generally in a common plane and parallel to the outer tooth edge.

15. Blade for a rotatable tire rasp having an outer working edge embodying a plurality of teeth having a leading edge, a trailing edge and an outer edge and in which teeth the leading edge thereof contains at least a first indentation which forms a first prong with the outer edge of the tooth and an inwardly spaced second indentation which forms a second prong with the first indentation, the underside of said first and second prongs of the leading edge being sloped at a positive angle, and the outer edge of the teeth intermediate their said leading and trailing edges being interrupted by a notch the trailing edge of which is at other than a positive rake angle.

16. Blade as claimed in claim 15 wherein the notch extends to a depth below the second prong of the leading edge of the tooth.

17. Blade as claimed in claim 15 wherein the tooth contains an opening spaced below the notch.

18. Blade as claimed in claim 17 wherein the opening has a trailing edge, portions of which are disposed above and below the second prong of the tooth leading edge.

19. Blade as claimed in claim 18 wherein the portion of the trailing edge of the opening disposed above the second prong is sloped at a positive rake angle and the portion of said trailing edge of the opening below the second prong is sloped at a negative rake angle.

20. Blade as claimed in claim 19 wherein the upper side of the second prong is sloped at a negative rake angle.

21. Blade as claimed in claim 15 wherein the trailing edge of the tooth contains at least a third indentation which forms a third prong with the outer edge of the tooth and an inwardly spaced fourth indentation which forms a fourth prong with the third indentation, the underside of said third and fourth prongs being sloped at a negative rake angle.

22. Blade as claimed in claim 21 wherein the tooth contains an opening spaced below the notch in the outer edge of the tooth, said opening being intermediately disposed between the second and fourth prongs.

23. Blade as claimed in claim 22 wherein the portion of the trailing edge of said opening immediately above said second and fourth prongs is sloped at a positive rake angle and the portion of the trailing edge of said opening immediately below said second and fourth prongs is sloped at a negative rake angle.

24. Blade as claimed in claim 21 wherein the tooth is reversely bent such that the second and fourth prongs lie to one side of a plane including the tooth body and to one side of the first and third prongs.

25. Blade as claimed in claim 24 wherein the first and third prongs lie in the plane of the tooth body.

26. Blade as claimed in claim 24 wherein the first and third prongs lie to the opposite side of the tooth body.

27. A tire rasp blade comprising a sheet metal member having a convex outer working edge and means in the blade body spaced from said working edge by which the blade is adpated for mounting in a rasp, said outer working edge of the blade comprising a plurality of teeth separated by inner and outer intersecting circular cut-outs, said teeth having a leading side edge, a trailing side edge and an outer edge, the leading and trailing side edges of said teeth each having a first sharp prong defined by the intersection of the outer circular cut-outs with the tooth outer edge and a second sharp prong defined by the intersection of the inner and outer circular cut-outs, and a notch interrupting the outer edge of the teeth between the first prongs of their leading and trailing edges.

28. A tire rasp blade as claimed in claim 27 wherein the teeth are so crimped that their leading and trailing edges lie in separate planes to opposite sides of the tooth body.

29. A tire rasp blade as claimed in claim 27 further having a circular opening in the body of the teeth centered between the second prongs of the said leading and trailing edges of the teeth.

30. A tire rasp blade as claimed in claim 29 wherein the notch comprises a half circular shape centered on the outer edge of the teeth and spaced above the circular opening.

31. A tire rasp blade as claimed in claim 27 wherein the notch comprises an elongated slot with parallel radial disposed leading and trailing edges which extend to below the second prongs.

32. A tire rasp blade comprising a sheet metal member having a convex working edge and means in the blade body spaced from said working edge which adapt the blade for mounting in a rasp, said working edge comprising a plurality of spaced teeth the leading and trailing edges of which are defined by intersecting outer triangular and inner circular shaped cut-outs, the outer triangular shaped cut-outs interrupting the outer edge of the blades to form first sharp prongs with the outer edges of adjacent teeth, the inner circular-shaped cut-outs interrupting the base side of the triangular shaped cut-outs to form second sharp prongs spaced inwardly of said outer tooth edge, and the outer edge of the teeth being notched.

33. A tire rasp blade as claimed in claim 32 wherein the working edge is folded laterally such that the second prongs of the teeth lie in a plane to one side of the tooth body and the first prongs lie generally in a plane including said tooth body.

34. A tire rasp blade as claimed in claim 33 wherein the notch in the outer edge of the teeth extend to below the second prongs.

35. A tire rasp blade as claimed in claim 33 wherein the notch terminates short of the second prongs and the tooth body contains an opening below the notch and generally at the level of the second prongs.

36. Blades for a tire rasp used to remove old rubber from worn or damaged surfaces in preparation for applying new rubber, the blades having a plurality of teeth along at least one edge thereof, said teeth having an outer cutting edge the face of which is inclined at a positive rake angle and forms a sharply acute outer prong with the outer tooth edge for cutting old rubber from a tire, said teeth also having an outer buffing edge the face of which is inclined at other than a positive rake angle for reducing the cut surface of the tire to a finely buffed texture, and said teeth having inner edges the face of one of which has a similar positive rake inclination as the face of the outer cutting edge and another of which inner edges has a face which is at a rake inclination similar to that of the outer buffing edge, said inner edges being located at levels below said outer cutting and buffing edges and to which the teeth may be sharpened so as to constitute cutting and buffing edges which extend the useful life of said teeth as their outer cutting and buffing edges become worn.

* * * * *

UNITED STATES PATENT OFFICE
CERTIFICATE OF CORRECTION

Patent No. __4059875__    Dated __November 29, 1977__

Inventor(s) __Wayne E. Jensen__

It is certified that error appears in the above-identified patent and that said Letters Patent are hereby corrected as shown below:

Column 8 line 46 "or" should be --for--

Column 9 line 39 "1640" should be --164--

Column 14 line 58 "blades" should be --blade--

Signed and Sealed this

Eighteenth Day of April 1978

[SEAL]

Attest:

RUTH C. MASON  
Attesting Officer

LUTRELLE F. PARKER  
Acting Commissioner of Patents and Trademarks